United States Patent [19]

Burgener et al.

[11] 4,236,255
[45] Nov. 25, 1980

[54] RACK ENTRY VEHICLE COMMUNICATION SYSTEM

[75] Inventors: Robert C. Burgener; Philip T. Martin, both of Columbus, Ohio; John J. Lord, Pontiac, Ill.

[73] Assignee: Interlake, Inc., Oak Brook, Ill.

[21] Appl. No.: 969,798

[22] Filed: Dec. 15, 1978

[51] Int. Cl.³ ............................................ H04B 9/00
[52] U.S. Cl. ...................................... 455/603; 180/167; 180/168; 414/909
[58] Field of Search .................. 414/909; 250/199; 455/603; 180/167, 168

[56] References Cited

U.S. PATENT DOCUMENTS

| | | | |
|---|---|---|---|
| 2,941,346 | 6/1960 | Perry | 56/10.5 |
| 2,996,137 | 8/1961 | Chu | 180/98 |
| 3,009,525 | 12/1972 | Stern | 180/98 |
| 3,095,937 | 7/1963 | Vulliet-Durand | 180/2 R |
| 3,314,189 | 4/1967 | Carroll | 180/98 X |
| 3,705,387 | 11/1961 | DeLiban | 180/98 X |
| 3,817,406 | 6/1974 | Sawada | 414/279 |
| 3,824,597 | 7/1974 | Berg | 325/51 |
| 3,838,412 | 9/1974 | Jones | 250/199 |
| 3,848,755 | 11/1974 | Bussienne | 414/279 |
| 3,880,299 | 4/1975 | Zollinger | 414/279 X |
| 4,095,097 | 6/1978 | Reeve | 250/199 |
| 4,150,284 | 4/1979 | Trenkler | 250/199 |

*Primary Examiner*—Howard W. Britton
*Attorney, Agent, or Firm*—Allegretti, Newitt, Witcoff & McAndrews

[57] ABSTRACT

Improved apparatus for communicating information between a movable rack entry vehicle and a reference station by means of optical radiation, such as infrared radiation. A universal asynchronous receiver-transmitter is located on both the vehicle and the reference station so that information originating in parallel form can be communicated in serial form.

12 Claims, 8 Drawing Figures

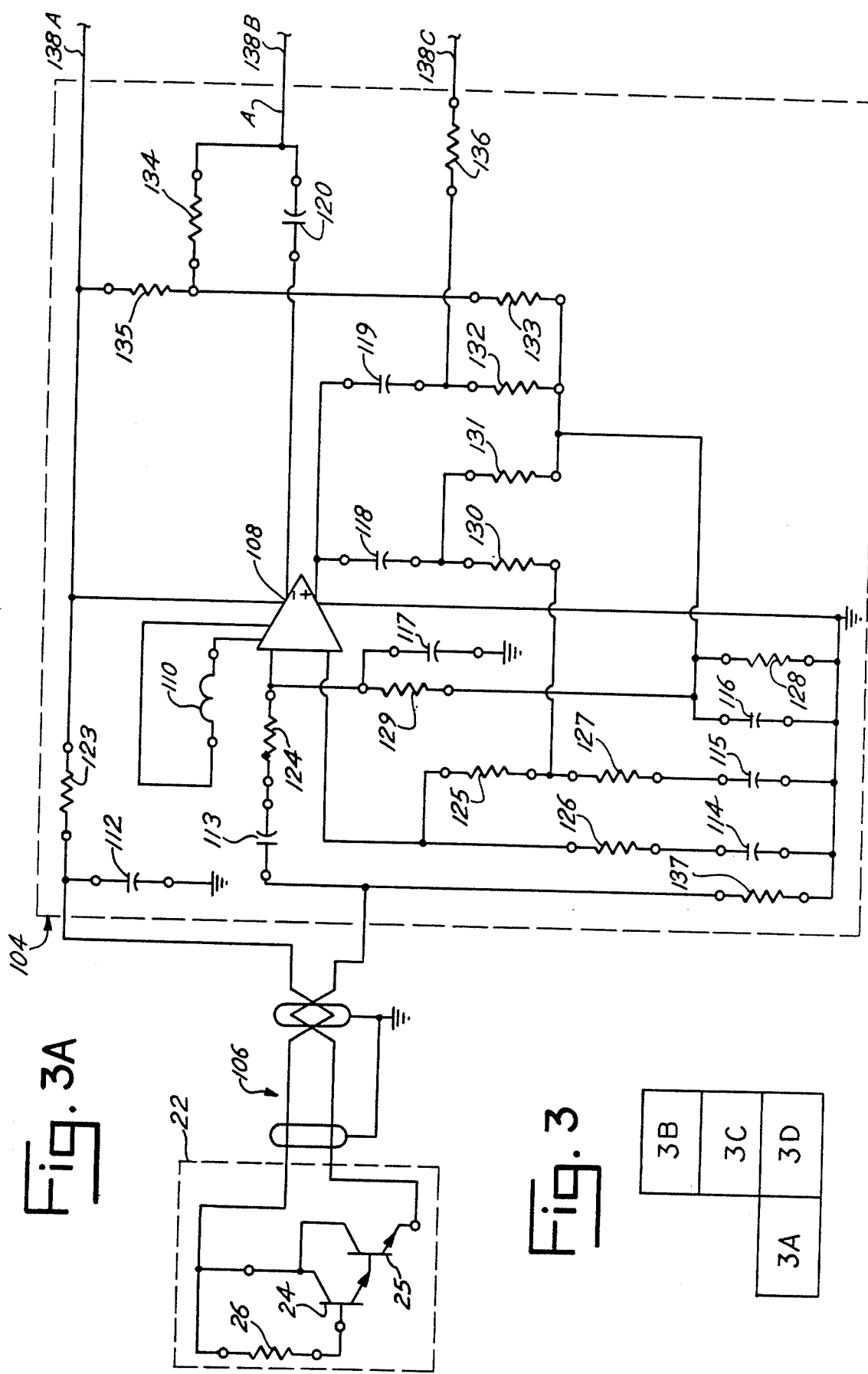

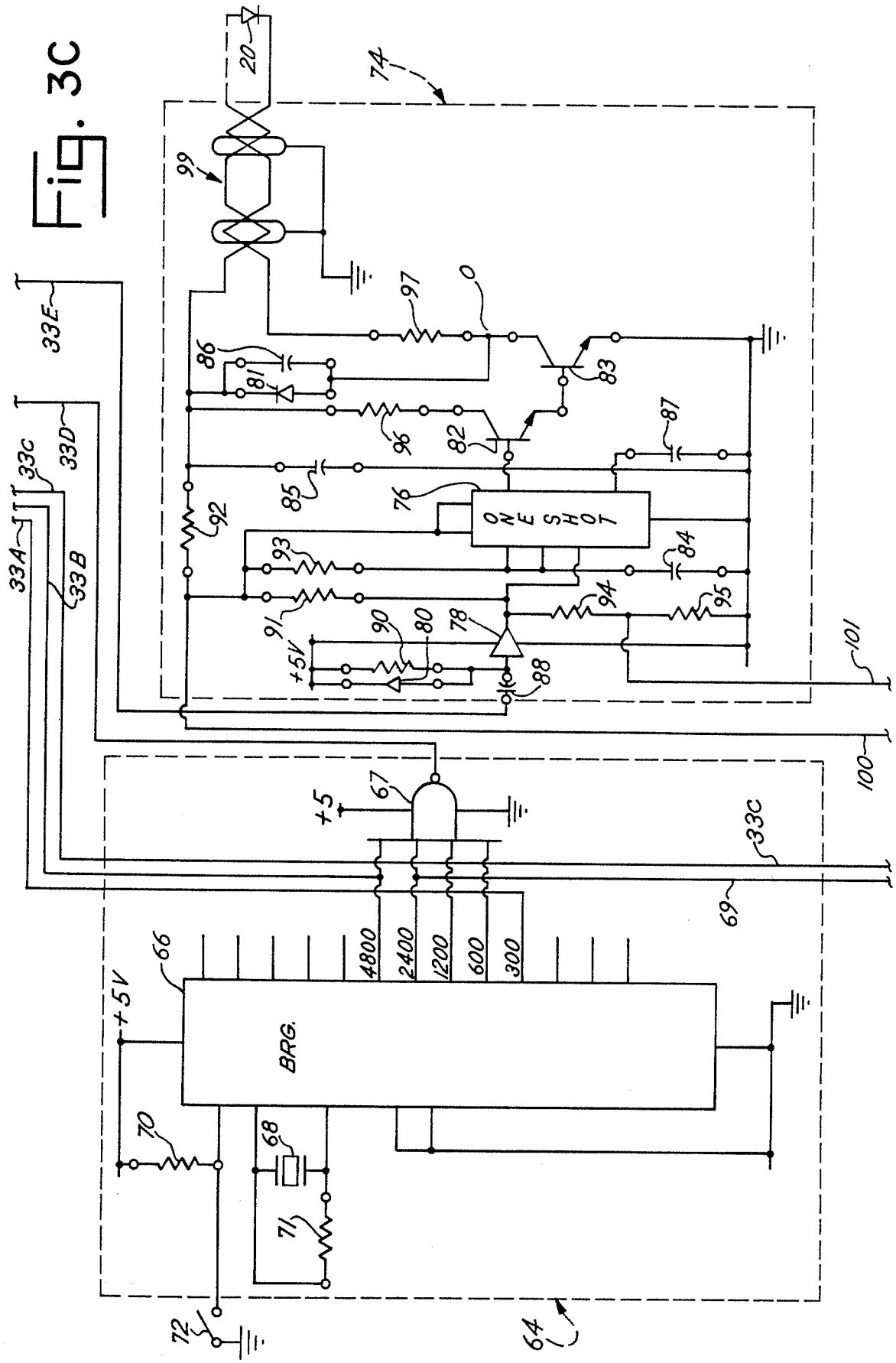

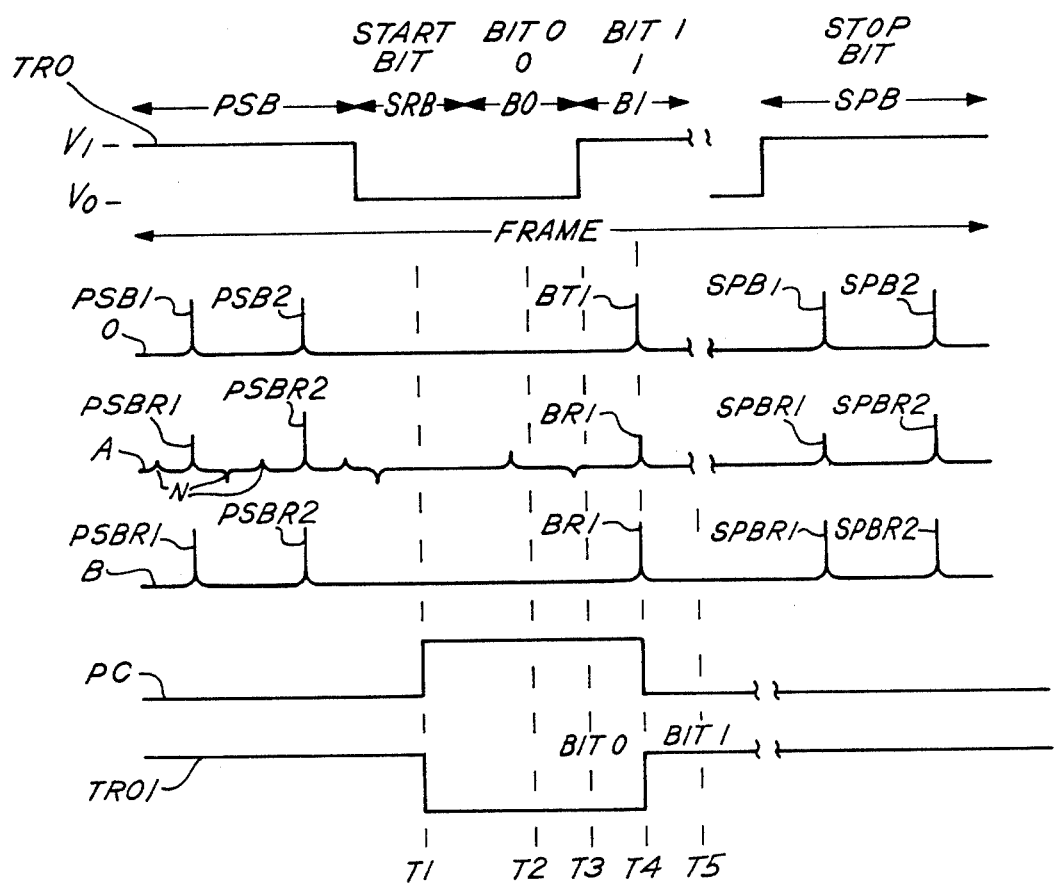

RACK ENTRY VEHICLE COMMUNICATION SYSTEM

BACKGROUND AND SUMMARY OF THE INVENTION

This invention relates to rack entry vehicles, and more particularly relates to apparatus for communicating information between a rack entry vehicle and a reference station.

There is a need for an accurate and reliable means of communicating information between a reference station and a movable vehicle. One field in which the need is acute is automatic storage systems. Such systems normally contain a large number of rows of racks on which loads are stored. The loads are normally retrieved by an unattended vehicle which moves on tracks between the rows of goods. The vehicle may be carried on a crane which moves up and down aisles between the rows. In order to effectively store and retrieve goods, the vehicle must be able to communicate with the aisle crane.

In the past, a communication link between the vehicle and the crane has taken the form of an umbilical cord or radio frequency communications. Either one of these approaches has disadvantages. The umbilical cord necessitates cumbersome and expensive cord winding equipment. Radio communications require approval by the Federal Communications Commission and careful shielding designed to provide protection from the environment and protection from interference by other radio transmitters in the area. Since the racks are grounded, a radio signal is severely attenuated as it propagates through the warehouse. The attenuation necessitates increased transmitter power which normally is discouraged by the FCC. If a low power transmitter is used, expensive receivers are required. In the event multiple vehicles are operated simultaneously, multiple carrier frequencies must be utilized in order to prevent interference between vehicles. This requirement substantially increases the cost of the overall system.

As a result, it is an object of the present invention to provide an improved communication system between a movable vehicle and a reference station.

It is another object to provide a system of the foregoing type suitable for use by a rack entry vehicle operating in a steel rack warehouse.

Yet another object is to provide a system of the foregoing type in which optical radiation, such as infrared radiation, is used for the communicating medium.

Still another object is to provide a system of the foregoing type in which the optical radiation is pulsed in order to encode the information transmitted between the vehicle and the station.

Still another object of the present invention is to provide a system of the foregoing type in which information is processed in parallel form, but is transmitted and received in the serial form.

DESCRIPTION OF THE DRAWINGS

These and other objects, advantages and features of the present invention will hereafter appear for purposes of illustration, but not of limitation, in connection with the accompanying drawings, wherein like numbers refer to like parts throughout, and wherein:

FIG. 3 illustrates the manner in which FIGS. 3A-3D are arranged;

FIGS. 3A, 3B, 3C and 3D are electrical schematic drawings of a preferred form of transmitting and receiving circuitry made in accordance with the present invention; and FIG. 4 is a diagram illustrating voltage waveforms generated by the like-lettered portions of the circuitry shown in FIGS. 3A-3D.

DESCRIPTION OF THE PREFERRED EMBODIMENT

Figure 1:
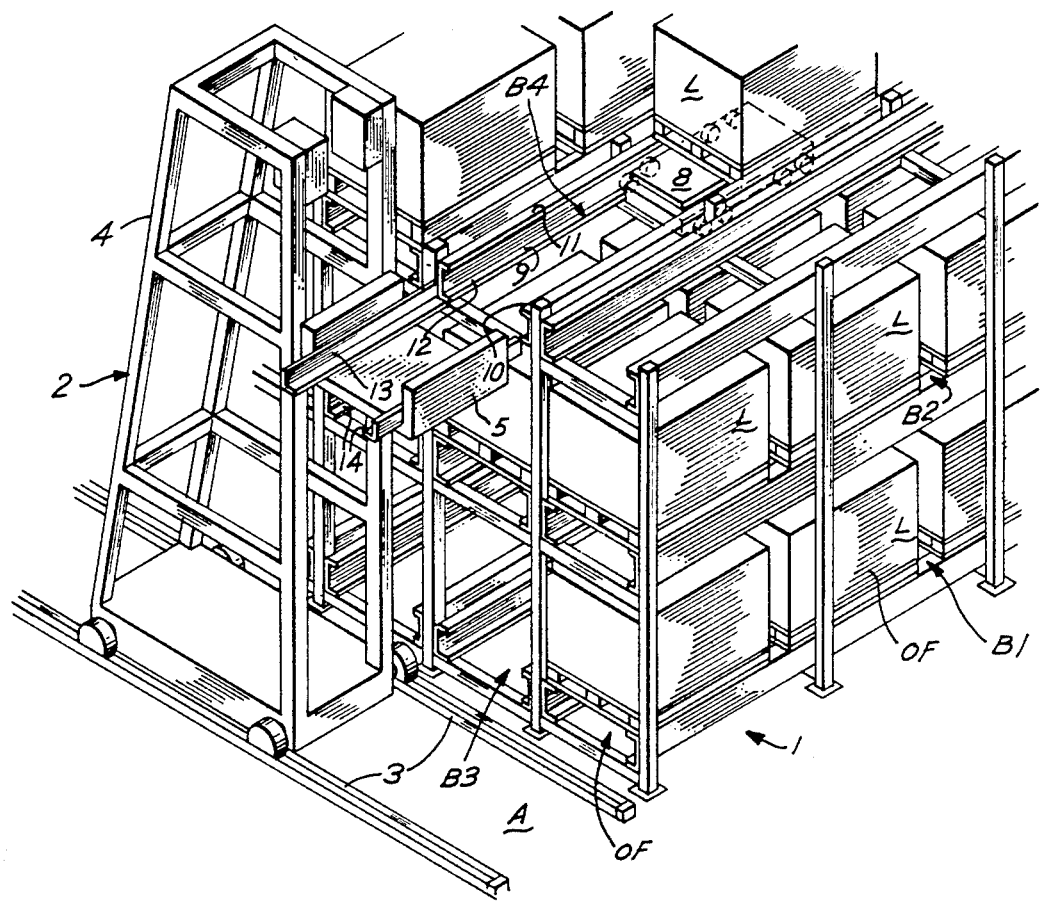
FIG. 1 is a partial perspective view of a high density warehousing system incorporating a storage and retrieval rack entry vehicle and communication link constructed in accordance with the principles of the present invention.

FIG. 1 illustrates a perspective partial view of a high density warehousing system in which a rack entry vehicle incorporating the principles of the present invention may be employed. The high density storage system includes at least one article storage rack structure having a plurality of elongate, generally horizontal bins B1, B2, B3, B4 on top of and alongside of each other in the rack structure. Each of the bins opens to the open front of the storage rack 1. The open front of the rack faces a longitudinal aisle A extending across the face of rack 1. Although not shown, it will be understood that the warehousing system may include additional racks and bins similar to rack 1 and may include more than one aisle.

A transfer vehicle 2 is located in aisle A for operation across open front OF of the rack to service the respective elongate bins. Transfer vehicle 2 may either be mounted for overhead operation or for floor operation in the aisle A. As shown in FIG. 1, the transfer vehicle 2 operates on a pair of spaced parallel floor rails 3. Transfer vehicle 2 may be operated either remotely or by an operator who rides the transfer vehicle, and may be either manually or computer controlled.

Transfer vehicle 2 includes a mast structure 4 which extends the height of the bins in rack 1. An elevatable platform 5 is mounted on the mast structure 4 for movement up and down the structure and into alignment with given ones of the bins.

A rack entry vehicle 8 is movable into and out of the rack structure 1 and its bins B1-B4 and onto and off platform 5. Each of the bins as shown in FIG. 1 preferably contains at the bottom thereof a pair of spaced U-shaped channels 9, 10 extending the length of the bins. The horizontally extending upper flange 11 of each of the channels 9 and 10 defines a horizontal surface upon which a palletized load L rests when in storage in the storage rack 1. The horizontally extending lower flange 12 defines a horizontal surface upon which rack entry vehicle 8 rolls for movement in the bin.

Lift platform 5 also preferably includes a pair of rails 13 of angled construction having a horizontal flange 14 which is adapted to define an upward facing rail surface for receipt of the rack entry vehicle upon the lift platform. This upper surface of flange 14 is alignable with the horizontal surfaces 12 of channels 9 and 10 in each of the bins.

The system thus far described is essentially conventional in rack entry vehicle high density storage systems. A description of the construction of the rack entry vehicle and communication link which forms the novel subject matter of the present invention will now follow.

Figure 2:
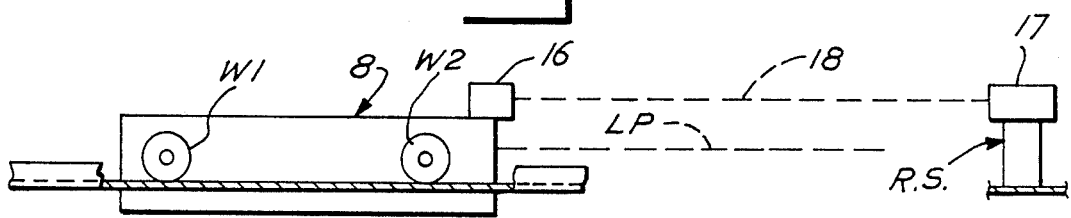
FIG. 2 is a schematic side elevational view of a preferred form of the vehicle and link shown in FIG. 1.

Referring to FIG. 2, vehicle 8 rolls on multiple wheels, two of which are identified as W1 and W2. The vehicle can roll back and forth on channels 9, 10 along a linear path LP which keeps the vehicle within line-of-sight of a reference station RS which may be located on platform 5. Identical transmitting-receiving units 16 and 17 are located on the vehicle and station and are aligned along an optical path 18. Each of the transmitting-receiving (TR) units 16 & 17 is identical, and may be understood from the following description of TR 16, shown in FIGS. 3A-3D.

Referring to FIG. 3C, TR 16 includes a source 20 which preferably takes the form of a diode which generates optical radiation in the infrared portion of the electromagnetic spectrum. As used in this specification and claims, the term optical radiation refers to radiation in the infrared, visible and ultraviolet portions of the electromagnetic spectrum having wave lengths from about $10^{-3}$ to $10^{-8}$ meters. Referring to FIG. 3A, TR 16 includes a detector circuit 22 which converts optical radiation into corresponding electrical signals. Circuit 22 comprises a phototransistor Darlington pair shown as transistors 24, 25 and a biasing resistor 26. Transistors 24 and 25 are biased to saturate in response to a high intensity light, such as a light which is close to the detector circuit. Driving transistors 24 and 25 into saturation limits the amplitude of the output signal from the detector circuit whenever a light source moves very close to circuit 22.

The remaining portion of the circuitry shown in FIGS. 3A-3D is a transceiver which both transmits and receives information by means of diode 20 and detector circuit 22. The transceiver basically comprises a universal asynchronous receiver/transmitter (UART) 30, A UART output logic circuit 32, a UART reset circuit 46, a Baud rate generator 64, a driver circuit 74, a high gain amplifier 104, a comparator 140, a blanking circuit 144, and a pulse converter 160.

Figure 3B:
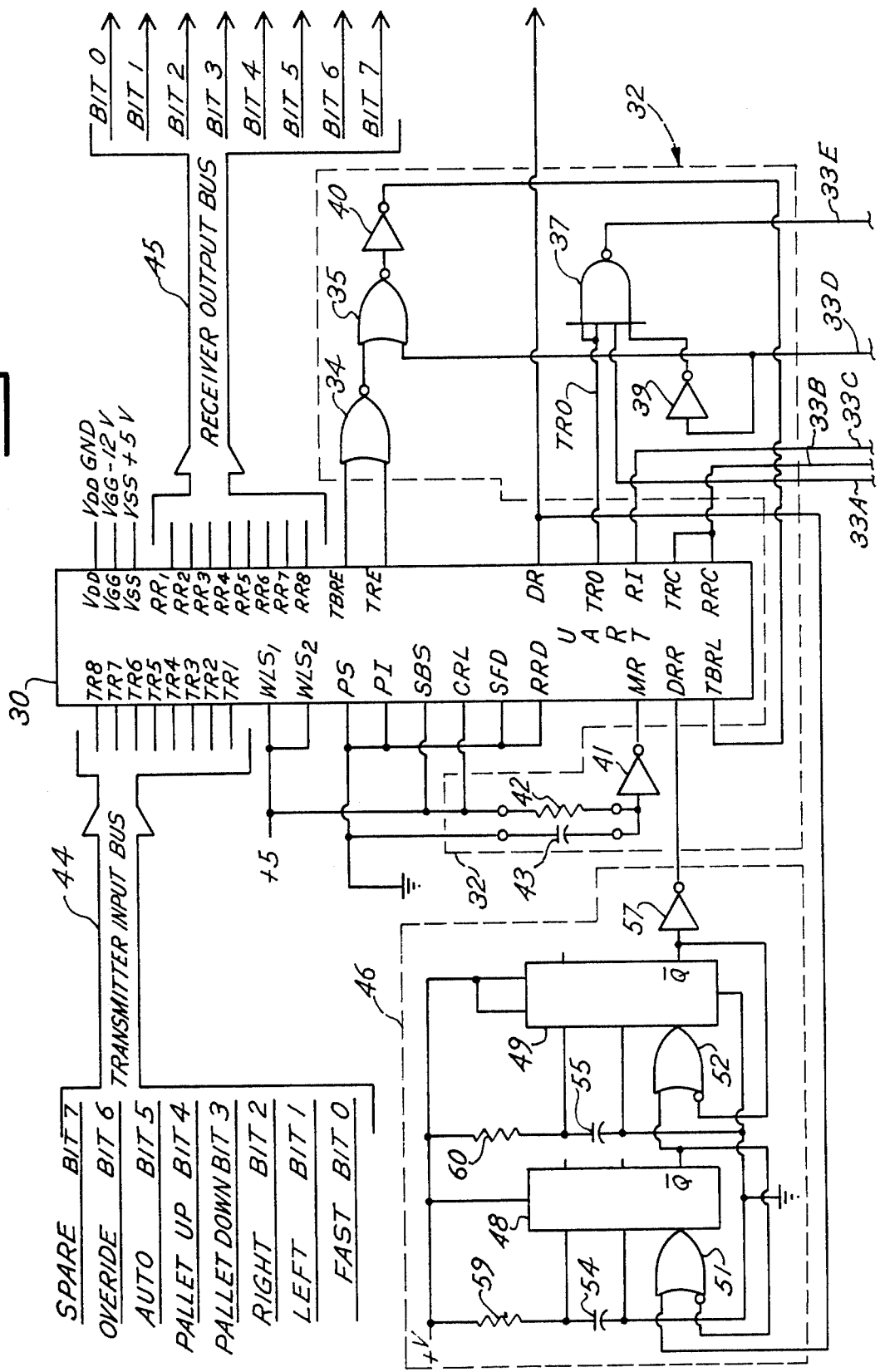

Referring to FIG. 3B, UART 30 is preferably a model TMS 6011 manufactured by Texas Instruments, Inc. The circuit is interconnected by conductors 33B and 33C.

UART output logic circuit 32 comprises NOR gates 34, 35, and a NAND gate 37, inverters 39-41, a resistor 42, and a capacitor 43. The circuit is interconnected by conductors 33A, 33D and 33E.

Eight bits of parallel encoded digital information is available to the UART on a transmitter input bus 44, and eight bits of parallel encoded digital information is produced by the UART on a receiver output bus 45.

UART reset circuit 46 comprises one shot multivibrators 48, 49, OR gates 51, 52, capacitors 54, 55, an inverter 57, and resistors 59, 60. The one shot multivibrators and OR gates may be implemented by model CD4098 manufactured by Radio Corporation of America. The reset circuit delays the resetting of the receiver output buffer within UART 30 to allow time to transfer the data from the buffer to bus 45.

Referring to FIG. 3C, baud rate generator 64 comprises a BRG model MC14411 manufactured by Motorola, Inc. and identified by number 66. The generator also includes a NAND gate 67, a crystal 68 and resistors 70 and 71. The baud rate generator is used to generate the frequency standard for UART 30. The generator also provides 2400 Hertz square wave pulses over a conductor 69. The pulses are used to demodulate the signals received by detector circuit 22. A switch 72 is closed to reset BRG 66.

Driver circuit 74 comprises a one shot multivibrator 76, an amplifier 78, diodes 80, 81, transistors 82, 83, capacitors 84-88 and resistors 90-97, all connected as shown. The driver circuit receives pulse position serial encoded information from UART 30 via conductor 33E. One shot 76 reduces the duration of the pulses to about 20 microseconds in order to drive diode 20. The 20 microsecond pulses containing the serial data are transmitted to diode 20 over a shielded cable 99. Short duration pulses are used to prevent overheating of diode 20. The circuit is interconnected by conductors 100, 101, and 33E.

Referring to FIG. 3A, high gain amplifier 104 receives electrical signals through a shielded cable 106 and comprises an opamp 108, an inductor 110, capacitors 112-120, resistors 123-137, and conductors 138A-138C, all connected as shown. Amplifier 104 amplifies the weak electrical signals received from transistor 25, and raises them to a level suitable for driving comparator 140. Resistors 125, 126, 127 and 130 combine with capacitors 114 and 115 to form a frequency selective negative feedback network from the output of opamp 108 to its input. The network passes low frequencies, such as 60 Hertz and 120 Hertz, while attenuating higher frequencies. In this way, the gain of amplifier 104 is substantially reduced for low frequency signals which could be generated by detector circuit 22 from undesired sources such as room lights. This feature enables the system to reject light sources that otherwise might interfere with the communication process. Opamp 108 has a capability to recover in about 3 microseconds and no more than 10 microseconds from being overdriven into hard saturation. This recovery characteristic of the amplifier is important to the overall dynamic range of the system, which will be discussed later. One appropriate opamp is a model MC 1733 manufactured by Motorola, Inc.

Figure 3D:
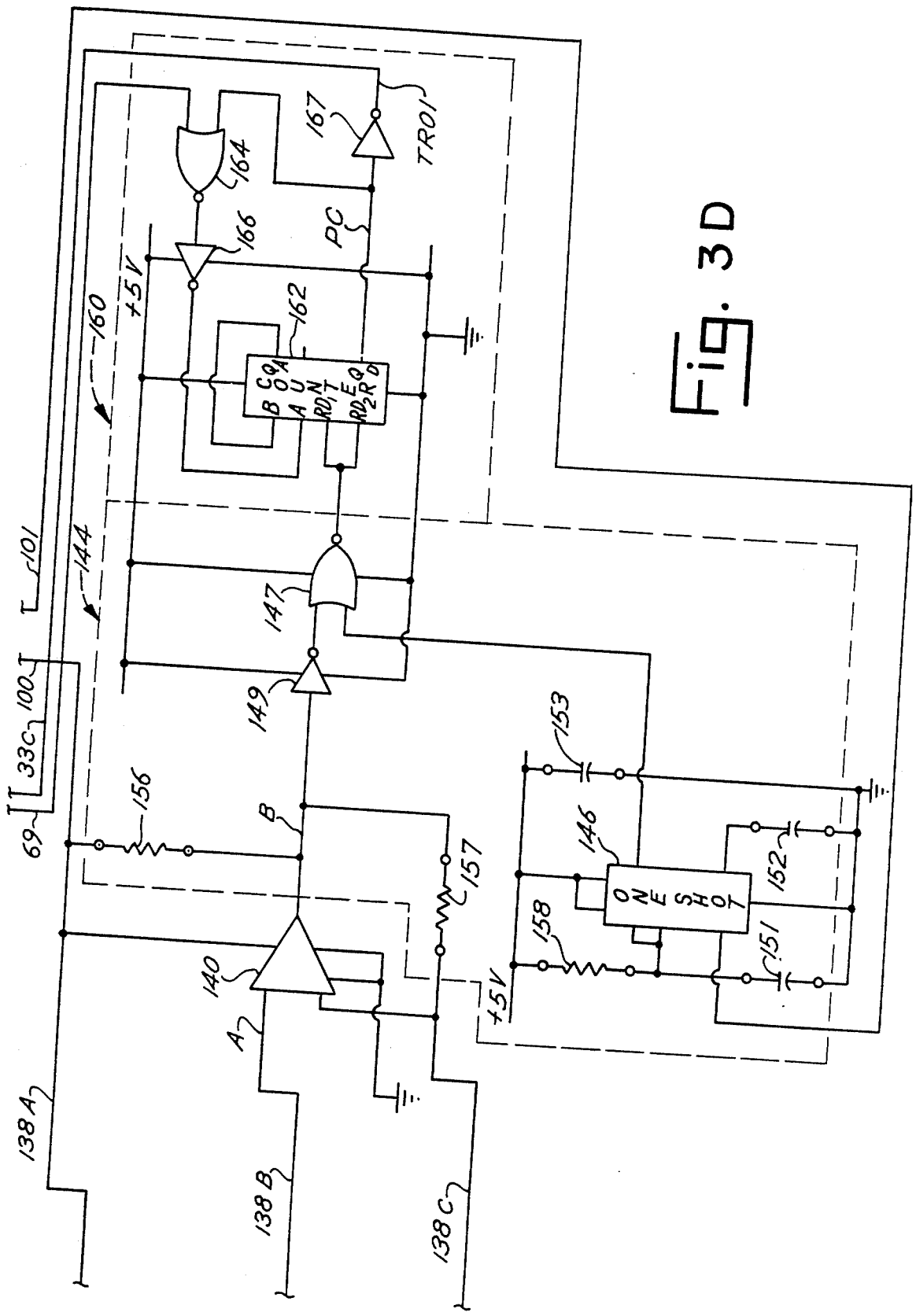

Referring to FIG. 3D, comparator 140 is used to reject the noise which is amplified along with the serial data signals received from transistor 25. This rejection is accomplished by means of resistors 128, 132-136, and 157. Resistors 136 and 157 form a positive feedback network to the input of comparator 140. This positive feedback introduces hysteresis into the comparator characteristic so that a deadband exists between the comparator turn-on and turn-off input signal levels. This hysteresis is enhanced by a small voltage across resistor 133 in series with resistors 128 and 135, which together set the input bias on comparator 140. Resistors 132 and 134 couple the voltage across resistor 133 to the inputs of comparator 140 to enhance the deadband and assure that comparator 140 returns to the output-low state in the quiescent mode. Thus the comparator rejects noise signals which are below the turn-on levels. Additionally, once the comparator is turned on by a signal pulse, its turn-off by noise during a signal pulse is prevented by the positive feedback-induced hysteresis. This hysteresis also prevents the comparator from triggering falsely on small distortions of the signal pulse waveforms, such as over and under shoots which can occur due to the saturation of amplifier 104 or the charge-up of coupling capacitors, such as capacitors 119 and 120.

The combination of circuits 22, 104 and 140 has a unique ability to operate over a wide range of light input signal levels. The wide range of signal levels results from the fact that TR 16 and TR 17 can operate at distances from less than one inch to more than 100 feet, a distance ratio of 1200 to 1, and, because of inverse square law effects, a range of more than 1,400,000 to 1 in light pulse intensity. This ability to operate under wide distance and signal strength ranges is accomplished by means of the controlled saturation characteristics and recovery times of the radiation detector circuit 22, amplifier 104, and comparator 140. It provides reliable circuit operation when the distance between vehicle and station is changing with time, an important capability for remote control of a moving vehicle.

The electrical pulses generated by comparator 140 are blanked by blanking circuit 144 while drive circuit 74 is pulsing diode 20. The blanking circuit comprises a one shot multivibrator 146, a NOR gate 147, an inverter 149, capacitors 151-153 and resistors 156-158. A blanking circuit is needed to avoid the transmission and receipt of the same pulses by the same unit. For example, if TR 16 is transmitting pulses to TR 17, the blanking circuit prevents the receipt by TR 16 of the pulses transmitted by TR 16. If TR 16 receives the pulses transmitted by TR 16, it could interpret them as a communication from TR 17. This would result in an erroneous transmittal of information which the blanking system avoids.

Pulse converter 160 comprises a 16 bit counter 162, a NOR gate 164 and inverters 166, 167. The pulse converter converts the 20 microsecond data pulses from comparator 140 into longer duration pulses suitable for interpretation by UART 30.

OPERATION

The operation of the system will be described assuming that information is transmitted from TR 16 to TR 17. Assuming that 8-bit information is available in parallel form on transmitter input bus 44, the information is converted to pulse position serial form by UART 30 and logic circuitry 32 in a well-known manner. Driver circuit 74 converts the serial pulses received from circuit 32 on conductor 33E into 20 microsecond pulses which transfer the serial information to diode 20. The transmittal of a voltage pulse to diode 20 represents a logical 1 and the absence of a voltage pulse at the proper time represents a logical 0.

This mode of operation is more clearly illustrated in FIG. 4 in which waveform TRO represents the waveform produced at the TRO output of UART 30 in response to a logical 0 on the bit 0 conductor of bus 44 and a logical 1 on the bit 1 conductor of bus 44. The remaining portion of the waveform corresponding to bits 2-7 of bus 44 is omitted. In order to transmit data, TRO is switched between a lower voltage V0 and a higher voltage V1. By switching between V0 and V1, UART 30 converts the 8 bits of parallel data on bus 44 into serial data represented in pulse position form. The serial data is transmitted in 8 bit frames which are commenced by a start bit and terminated by a stop bit which has a duration twice as long as the duration of the start bit or the data bits. Each start bit and data bit (e.g., BIT 0) has a duration of about 208 microseconds. For example, UART 30 generates a start bit during time period SRB by switching to voltage V0. Prior to such start bit, TR0 is maintained at voltage V1 for no less than the duration PSB of a prior stop bit. The stop bit is generated during time period SPB by switching TRO to voltage V1. Referring to waveform 0, during a prior stop bit, a series of 20 microsecond pulses (such as PSB1, PSB2) are transmitted to diode 20 approximately every 208 microseconds. There must be at least two pulses in the series.

Each of the 20 microsecond pulses results in a corresponding pulse of infrared radiation from diode 20.

The start bit eliminates the 20 microsecond pulses from waveform 0 during time period SRB. (Waveform 0 shows the collector voltage of transistor 83 of circuit 74, FIG. 4.) As a result, diode 20 produces no radiation during time period SRB. The stop bit results in two 20 microsecond pulses SPB1, SPB2 that are transmitted to diode 20. The logical state of bit 0 of bus 44 is represented by maintaining TRO at voltage V0 during time period B0, and the logical state of bit 1 of bus 44 is represented by switching TRO to voltage V1 during time period B1. Since bit 0 represents a logical 0 state, it results in no corresponding output pulse to diode 20. Conversely, since bit 1 represents a logical 1 state, it results in a 20 microsecond pulse BT1 which is transmitted to diode 20. Pulses in waveform 0 (e.g., BT1) are produced at consistent points in time during the corresponding time periods defined by TRO due to the operation of NAND gate 67 which receives timing pulses from generator 66 at the rates of 4800, 2400, 1200 and 600 Hertz. Pulses PSB1, PSB2, SPB1, SPB2 result in pulse position modulated infrared optical radiation which is transmitted through the atmosphere to the detector circuit 22R in TR 17 which corresponds to detector circuit 22. (The components of TR 17 which correspond to the identical components of TR 16 described above will be referred to by the suffix "R".) The detector circuit converts the radiation pulses (as well as background radiation noise N) into corresponding electrical signals which are amplified and filtered by amplifier 104R to produce waveform A (FIG. 4). Waveform A shows the signal at the input of comparator 140. In waveform A, 20 microsecond pulses PSBR1, PSBR2, BR1, SPBR1 and SPBR2 correspond to transmitted pulses PSB1, PSB2, BT1, SPB1 and SPB2, respectively. Comparator 140R discriminates against the noise and amplitude difference in the pulses in order to generate a voltage waveform B. The output of comparator 140R is used to reset counter 162, as will be discussed below.

The 20 microsecond data pulses then are converted into pulses having approximately the same duration as those produced by output TRO in converter circuit 160R. In order to achieve this result, the QD output of counter 162R is reset to its zero state each time a reset pulse is received from comparator 140R.

As soon as the reset pulse is removed, the counter begins to receive count pulses (via lead 69) from the 2400 Hertz output of BRG66R. Referring to waveform PC, FIG. 4, as soon as 8 pulses have been received, the QD output of counter 162R is switched to its 1 state and remains in that condition until a pulse is received from comparator 140R. Waveform PC shows the QD output of counter 162R. For example, prior to time T1, pulses PSB1 and PSB2 have been resetting counter 162R prior to its counting 8 counts, thereby preventing QD from switching to its 1 state. At T1, the absence of a pulse from comparator 140R allows the counter to count 8 pulses, to switch the QD output to the 1 state, and to remain in that state until a reset pulse is received from comparator 140R at time T4.

The foregoing operation constructs an inverted image (PC) of the TRO waveform which originally created the information transmitted from TR 16 to TR 17. Waveform PC is inverted by inverter 167R in order to produce waveform TRO1 which corresponds to original waveform TRO, but is shifted in phase. UART 30R is constructed so that it samples waveform TRO1 approximately at times T3 an T5 in order to determine the logic state of the bit 0 and bit 1 information. As can be seen from FIG. 4, the bit 0 and bit 1 information of waveform TRO1 is in the same logic state as the original information created on output TRO. The information is converted to parallel form on receiver output bus 45 and is available for use by TR 17. That is, bit 0 of bus 45 is switched to its 0 state and bit 1 of bus 45 is switched to its 1 state.

The use of pulse encoded optical radiation information offers a number of advantages which are unattainable by the prior art control techniques. It has been found that such communications are reliable and unaffected by ambient light conditions. There is no cumbersome electrical wiring which must be coiled and uncoiled as the vehicle moves. Since radio frequencies are not involved, there is no possibility of interference from adjacent radio transmitters. Using the unique pulsing techniques described herein, it is possible to communicate between a reference station and a movable vehicle with a degree of accuracy and reliability previously unattainable.

Those skilled in the art will recognize that the single embodiment described in the specification may be altered and modified without departing from the true spirit and scope of the invention as defined in the accompanying claims.

What is claimed is:

1. In a vehicle for transporting loads among the racks of a warehousing system, improved apparatus for communicating variable information between the vehicle and a reference station as the vehicle is moving along a vehicle path comprising:
   source means for generating optical radiation;
   transducer means for converting optical radiation into corresponding electrical signals;
   means for supporting the source means and transducer means in alignment along an optical path as the vehicle is moved along the vehicle path; and
   transceiver means for modulating the generated optical radiation according to the information to be communicated and for converting the electrical signals resulting from received optical radiation into a useful form of information.

2. Apparatus, as claimed in claim 1, wherein the source means and transducer means are located both at the vehicle and at the station, wherein information can be transmitted from the vehicle to the station and vice versa.

3. Apparatus, as claimed in claim 1, wherein the source means comprises a source of infrared radiation.

4. Apparatus, as claimed in claim 3, wherein the source of infrared radiation comprises a diode.

5. Apparatus, as claimed in claim 1, wherein the transceiver means comprises parallel to serial converter means for changing information arranged in parallel form into serial output signals for driving the source means.

6. Apparatus, as claimed in claim 1, wherein the transceiver means comprises means for causing the optical radiation to be generated in the form of time-spaced pulses.

7. Apparatus, as claimed in claim 4, wherein the transducer means comprises a phototransistor sensitive to infrared radiation.

8. Apparatus, as claimed in claim 5, wherein the transceiver means comprises serial to parallel converter means for converting serial electrical signals into parallel form.

9. Apparatus, as claimed in claim 1, wherein the reference station is fixed in position and the vehicle moves in a linear path.

10. Apparatus, as claimed in claim 1, wherein the reference station is located on a crane which transports the vehicle among the racks.

11. Apparatus, as claimed in claim 1, wherein the transceiver means comprises:
   a high pass filter; and
   an amplifier capable of recovering from being driven into saturation in less than 10 microseconds.

12. Apparatus, as claimed in amended claim 1, wherein the vehicle path and optical path are parallel.

* * * * *